Figure 1:
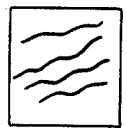
Figure 2:
Figure 3:
Figure 5:
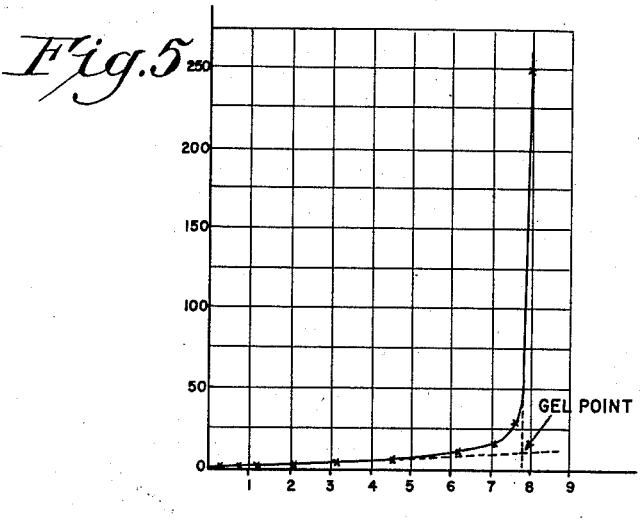
Figure 6:
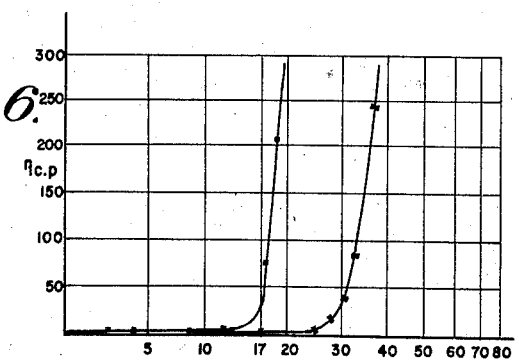
Figure 4:
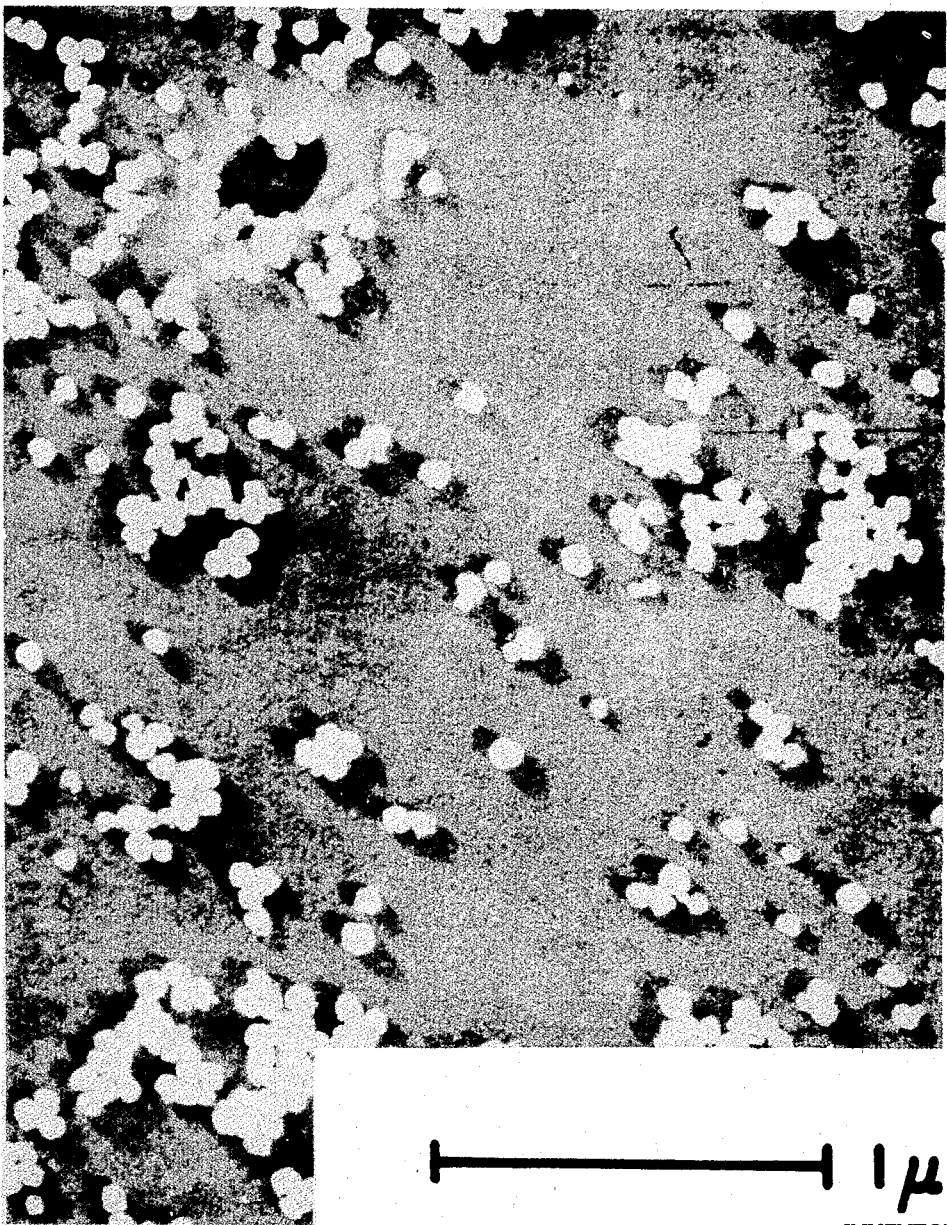

Oct. 13, 1959  V. E. SHASHOUA  2,908,659
SOLUTION OF A SYNTHETIC CROSS-LINKED POLYMER
IN A SWELLING LIQUID, PROCESS OF USING, AND
PRODUCTS OBTAINED THEREFROM

Filed Aug. 6, 1953  2 Sheets-Sheet 1

INVENTOR
VICTOR E. SHASHOUA

BY Carl A. Hechmer
ATTORNEY

United States Patent Office 2,908,659
Patented Oct. 13, 1959

2,908,659
SOLUTION OF A SYNTHETIC CROSS-LINKED POLYMER IN A SWELLING LIQUID, PROCESS OF USING, AND PRODUCTS OBTAINED THEREFROM

Victor E. Shashoua, Wilmington, Del., assignor to E. I. du Pont de Nemours and Company, Wilmington, Del., a corporation of Delaware Application August 6, 1953, Serial No. 372,673

36 Claims. (Cl. 260—32.6)

This invention relates to a novel process and product. More specifically, it provides a novel fiber and film and a process for their production.

Many attempts have been made to modify the properties of artificially made fibers by adding foreign materials either prior to or subsequent to spinning. Inorganic substances such as titanium dioxide, silicon oxide and carbon black, as well as organic substances, including materials of both high and low molecular weight of both natural and synthetic origin have been so employed. Synthetic adjuvants of high molecular weight, especially resins, have been used with varying degrees of success. Dyeability with particular dyestuffs, selective dye take-up and luster are some of the properties most sought after by such techniques. However, such variations are universally obtained at the expense of physical properties at elevated temperature, such as glazing, softening, sticking and zero strength temperatures, or mechanical properties, such as tenacity, modulus, elongation, and the like, or both. This is especially true when relatively large amounts of the adjuvants are used.

It is an object of the present invention to provide a novel process.

Another object is to provide a novel fiber and film.

A further object is to provide a novel liquid feed for extrusion into fibers and films and a process for the production of such a liquid feed.

A still further object is to provide a process for the controlled variation of certain properties of synthetic fibers and films without adversely affecting their mechanical properties and physical properties at elevated temperatures.

Other objects will become apparent in the course of the following specification and claims.

In accordance with the present invention, it has been found that controlled modification of artificial fibers and films can be accomplished without adversely affecting their mechanical properties and physical properties at elevated temperatures by incorporating in the fiber or film a microgel, the swollen form of a material referred to hereinafter as a "d-microgel." By a "d-microgel" is meant unimolecular colloidal particle of a cross-linked polymer having on the average a diameter of from about 0.01 micron to no greater than about 3 microns cross linked to such an extent that it forms a "microsol," as defined hereinafter, when extended in liquids in which it is swellable, and exhibits therein a characteristic defined as a "gel point" which will be described in detail hereinafter. While applicant does not wish to be bound by any particular theory, it is believed that in the formed fiber or film, the particle is usually present in the "non-swollen" or "d-microgel" form.

The invention will be more readily understood by reference to the figures.

Figure I is a diagrammatic representation of a polymeric structure commonly denoted as linear;

Figure II is a diagrammatic representation of a polymeric structure commonly denoted as branched chain;

Figure III is a diagrammatic representation of a polymeric structure commonly denoted as cross-linked;

Figure IV is a half-tone of an electronmicrograph of a surface on which is deposited d-microgel particles;

Figure V is a curve describing the variation in viscosity of a microsol over a range of concentrations which includes the gel point;

Figure VI is a series of curves illustrating the effect on gel point of the extent of cross-linking of a d-microgel.

The prevailing theory of polymer structure admits of two extreme forms definable by solubility characteristics. This theory attributes to those polymers exhibiting high solubility a linear or branched structure as is represented in Figures I and II. Insoluble polymers are assumed to be of a highly cross-linked nature in the manner illustrated in Figure III. The transition from the soluble to the insoluble form proceeds gradually in a direct relation to the degree of cross-linking. As solubility decreases, characteristic swellability is observed. Swellability diminishes as cross-linking is increased. The art denotes the insoluble form as cross-linked. The recognition of the liquids in which a particular cross-linked polymer is swellable will be obvious to those skilled in the art. In general, where the product is formed from a linear polymer by cross-linking, it is swellable in those liquids in which such linear component exhibits solubility. Where no identifiable linear counter part exists, swellability follows analogously the recognized laws applicable to the solubility of linear polymers. Such relationships are discussed in detail in "Solubility of Non-Electrolytes" by Joel H. Hildebrand (Reinhold Publishing Corp., N.Y., N.Y., 1936); "Industrial Solvents" by Ibert Mellan (Reinhold Pub. Corp., N.Y., N.Y., 1939); and "Vinyl and Related Polymers" by C. E. Schildknecht (John Wiley and Sons, N.Y., 1952).

The d-microgel particle is a cross-liked polymer, i.e., it is swellable in certain liquids, but does not dissolve therein in the accepted sense of the term. Because of its particle size limitations as previously defined it possesses unique properties when extended in a medium in which it is swellable. The swollen particle will be referred to hereinafter as a "microgel." When a microgel is distributed in an extending medium, the product will be referred to as a "microsol."

A microsol partakes of some of the properties of both true dispersions and true solutions. The particles exhibit Brownian motion. The microsols do not follow Staudinger's law, which relates viscosity to molecular weight. Microsol viscosities have been observed to have no relation whatever to the molecular weight of the microgel or the d-microgel. On evaporation of the extending medium, the d-microgel particle, in its original discrete form, is recovered. The microsols possess a "gel-point," i.e., a concentration of a given microgel particle in a given extending medium at which the extending medium is absorbed by the microgel particles. Below the gel point the microgel particles have no appreciable effect upon the viscosity of the extending medium. At and above the gel point, a sharp increase in viscosity with increase in microgel concentration is observed. The gel point will vary for any particular system, but it can be readily determined empirically by plotting the percent concentration by weight of d-microgel against the viscosity of the microsol. Such a curve is shown in Figure V wherein various concentrations of a microsol as prepared in Example I is plotted against the viscosity in centipoises. The sharp break in the curve at a concentration of 7.8% is the gel point for this system.

The following example is cited to illustrate the preparation of a d-microgel and the determination of its gel point.

Example 1

A mixture consisting of 10,600 grams of acrylonitrile, as monomer, and 308 grams of methylene bisacrylamide, the cross-linking agent, is stirred into an aqueous solution of an emulsifying agent made by dissolving 400 grams of sodium lauryl sulfate, in 24 liters of deaerated water, the mixing being done at 40° C. and under an atmosphere of nitrogen. The reaction components are vigorously agitated and a dispersion forms. Twenty grams of potassium persulfate in 20 ml. of water and 6 grams of sodium bisulfite in 20 ml. of water are immediately added as catalyst and activator, respectively. A bluish opalescence is observed. Stirring is continued at temperature for 5 hours. The suspended particles are coagulated by the addition of sodium chloride and collected in a centrifuge. They are washed thoroughly with water to remove all traces of salt and emulsifying agent. Unreacted organic components are washed out with a mixture of equal parts of methanol and water. A final washing is performed with pure methanol. 8.5 kilograms of d-microgel having an average diameter of between 0.12 and 0.14 micron is obtained.

A series of ten microsols is prepared by dispersing the above product in dimethylformamide by stirring for about 10 minutes in a Waring Blendor. A milky dispersion results. After removal of the water and methanol by vacuum distillation over a steam bath, the milky appearance changes to a blue opalescence. The concentration by weight of d-microgel in each microsol is indicated on the graph, Figure V, along the abscissa. The viscosity of each microsol is determined at 20° C. and is indicated on the graph along the ordinate axis. The concentration at which substantial change in viscosity occurs is shown to be 7.8%. This is the gel point.

It has also been found possible to approximate gel points by calculation, using a modification of Einstein's equation for the viscosity of spherical particles. Thus, Einstein's equation is:

$$[\eta] = 0.025 v$$

where $v$ is the specific volume of the particle (or the reciprocal of its density) and $[\eta]$ is the intrinsic viscosity. This term is well-known in the art and is defined in "Fundamental Principles of Polymerization" by G. F. D'Alelio, John Wiley and Sons, Inc., (1952) at page 228. Since microsols do not obey Staudinger's laws, the values of their intrinsic viscosities of microgels are merely "apparent" values. In the case of the cross-linked microgel, Einstein's relationship is further complicated by a swelling factor. The apparent or observed intrinsic viscosity of a microgel can thus be expressed:

$$[\eta]^\circ = \frac{0.025}{\rho} S$$

where $S$ is the swelling factor and $\rho$ is the particle density. Since $[\eta]^\circ$ and $\rho$ can be measured, $S$ can be found by simple substitution. The multiple of the swelling factor, necessary to absorb 100% of the extending medium will be the gel point as previously defined.

The following example is cited to illustrate such a computation.

*Example 2*

The technique of Example 1 is followed employing the following ingredients:

Monomer: 53 grams of acrylonitrile
Cross-linking agent: 5.9 grams of ethylene bismethacrylate
Dispersing agent: 4 grams of sodium lauryl sulfate
Dispersing medium: 300 mls. of water
Catalyst: 0.3 gram of potassium persulfate in 20 mls. of water
Activator: 0.16 gram of sodium bisulfite in 20 mls. of water By measuring the viscosities of dimethylformamide and a microsol of the above microgel in dimethylformamide at a temperature of 20° C., the microgel particle is observed to have an apparent intrinsic viscosity of 0.45. Assuming that its density does not vary appreciably from that of polyacrylonitrile, i.e. 1.18, then by substituting:

$$S = \frac{0.45 \times 1.18}{0.025} = 21.2$$

and $$\text{Gel point} = \frac{100}{S} = \frac{100}{21.2} = 4.71\%$$

A gel point curve indicates it to be 4.27%. (The polymerization period in the above example is 16 hours.)

The following examples illustrate the production of various microgels by addition polymerization. In each example the emulsion technique of Example 1 is followed. The apparent intrinsic viscosity in each case is measured in dimethylformamide. The particle diameter refers to the "d-microgel" form.

*Example 3*

Monomer: 16 grams of acrylonitrile, 16 grams of vinylpyridine
Cross-linking agent: 2 grams of ethylene bisacrylate
Catalyst: 2 grams of $\alpha,\alpha,\text{azo-bis}(\alpha,2,2\text{-dimethylvaleronitrile})$
Dispersing agent: 6 grams of sodium lauryl sulfate
Dispersion medium: 600 ml. of water
Polymerization period: 24 hours
Particle diameter: 0.07 to 0.1 micron
Yield: 28 grams

*Example 4*

Monomer: 53 grams of acrylonitrile
Cross-linking agent: 1.98 grams of ethylene bis methacrylate
Catalyst: 0.3 gram of potassium persulfate in 20 ml. of water
Activator: 0.16 gram of sodium bisulfite in 20 ml. of water
Dispersing agent: 2.5 grams of sodium lauryl sulfate
Dispersion medium: 250 ml. of water
Polymerization period: 15 hours
Apparent intrinsic viscosity: 1.73
Gel point: 1.2%
Particle diameter: 0.04 to 0.06 micron
Yield: 49.5 grams

*Example 5*

Monomer: 100 grams of acrylonitrile
Cross-linking agent: 7.3 grams of ethylene bis methacrylate
Catalyst: 0.1 gram of potassium persulfate in 20 ml. of water
Activator: 0.03 gram of sodium bisulfite in 20 ml. of water
Dispersing agent: 2 grams of sodium lauryl sulfate
Dispersion medium: 120 ml. of water
Polymerization period: 5 hours
Apparent intrinsic viscosity: 0.55
Gel point: 3.84%
Particle diameter: 0.12 to 0.14 micron
Yield: 90 grams

*Example 6*

Monomer: 50 grams of acrylonitrile
Cross-linking agent: 50 grams of ethylene bis methacrylate
Catalyst: 0.3 gram of potassium persulfate in 20 ml. of water
Activator: 0.15 gram of sodium bisulfite in 20 ml. of water
Dispersing agent: 6 grams of sodium lauryl sulfate
Dispersion medium: 600 ml. of water
Polymerization period: 16 hours
Apparent Intrinsic viscosity: 0.07
Gel point: 30.5%
Particle diameter: 0.03 to 0.05 micron
Yield: 65 grams

Example 7
Monomer: 25 grams of acrylonitrile
Cross-linking agent: 25 grams of divinylbenzene
Catalyst: 0.3 gram of potassium persulfate in 20 ml. of water
Activator: 0.1 gram of sodium bisulfite in 20 ml. of water
Dispersing agent: 3 grams of sodium lauryl sulfate
Dispersion medium: 300 ml. of water
Polymerization period: 16 hours
Gel point: 30%
Particle diameter: 0.02 to 0.05 micron
Yield: 20 grams

Example 8
Monomer: 53 grams of acrylonitrile
Cross-linking agent: 1.56 grams of methylene bis acrylamide
Catalyst: 0.1 gram of potassium persulfate in 20 ml. of water
Activator: 0.3 gram of sodium bisulfite in 20 ml. of water
Dispersing agent: 2 grams of sodium lauryl sulfate
Dispersion medium: 120 ml. of water
Polymerization period: 4 hours
Apparent intrinsic viscosity: 0.28
Gel point: 7.6%
Particle diameter: 0.1 to 0.12 micron
Yield: 51.5 grams

Example 9
Monomer: 53 grams of acrylonitrile
Cross-linking agent: 2.31 grams of methylene bis acrylamide
Catalyst: 0.1 gram of potassium persulfate in 20 ml. of water
Activator: 0.3 gram of sodium bisulfite in 20 ml. of water
Dispersing agent: 2 grams of sodium lauryl sulfate
Dispersion medium: 120 ml. of water
Polymerization period: 4 hours
Apparent intrinsic viscosity: 0.17
Gel point: 10.6%
Yield: 51.6 grams

Example 10
Monomer: 100 grams of acrylonitrile
Cross-linking agent: 4.55 grams of methylene bis acrylamide
Catalyst: 0.1 gram of potassium persulfate in 20 ml. of water
Activator: 0.02 gram of sodium bisulfite in 20 ml. of water
Dispersing agent: 2 grams of sodium lauryl sulfate
Dispersion medium: 120 ml. of water
Polymerization period: 4 hours
Gel point: 8.9%
Particle diameter: 0.1 to 0.3 micron
Apparent intrinsic viscosity: 0.17

Example 11
Monomer: 10 grams of acrylonitrile
Cross-linking agent: 10 grams of benzene diallyl phosphonate
Catalyst: 1 ml. of 30% hydrogen peroxide, 0.3 gram of thiourea
Dispersing agent: 4 grams of sodium lauryl sulfate
Dispersion medium: 300 ml. of deaerated water
Polymerization period: 4 hours
Apparent intrinsic viscosity: 0.03
Phosphorus analysis: 5.72%
Particle diameter: 0.04 to 0.08 micron
Yield: 8 grams

Example 12
Monomer: 64 grams of methacrylonitrile and 64 grams of vinylpyridine
Cross-linking agent: 8 grams of ethylene bis methacrylate
Catalyst: 2 grams of $\alpha,\alpha$-azo-bis($\alpha$,2,2-dimethylvaleronitrile)
Dispersing agent: 18 grams of sodium lauryl sulfate
Dispersion medium: 1800 ml. of deaerated water
Polymerization period: 18 hours
Particle diameter: 0.06 to 0.09 micron
Yield: 109 grams

Example 13
Monomer: 32 grams of dimethylaminoethyl methacrylate (freshly distilled)
Cross-linking agent: 3 grams of ethylene bis methacrylate
Catalyst: 1.2 grams of $\alpha,\alpha$-azo-bis($\alpha$,2,2-dimethylvaleronitrile)
Dispersing agent: 3 grams of sodium lauryl sulfate
Dispersion medium: 300 ml. of deaerated water
Polymerization period: 18 hours
Particle diameter: 0.04 to 0.06 micron
Yield: 32.5 grams (cannot be coagulated with salt. Is coagulated with strong mineral acid).

Example 14
Monomer: 3180 grams of acrylonitrile
Cross-linking agent: 119 grams of ethylene bismethacrylate
Catalyst: 18 grams of potassium persulfate in 200 ml. of water
Activator: 6 grams of sodium bisulfite in 100 ml. of water
Dispersing agent: 180 grams of sodium lauryl sulfate
Dispersion medium: 18 liters of water
Polymerization period: 8 hours
Apparent intrinsic viscosity: 1.53
Gel point: 2.25%
Particle size: .08–.1 micron
Yield: 2570 grams (82%)

Example 15
Monomer: 53 grams of acrylonitrile
Cross-linking agent: 11.9 grams of ethylene bismethacrylate
Catalyst: .3 gram potassium persulfate in 20 ml. of water
Activator: .16 gram sodium bisulfite in 20 ml. of water
Dispersing agent: 4 grams of sodium lauryl sulfate
Dispersion medium: 300 ml. of water
Polymerization period: 16 hours
Apparent intrinsic viscosity: .44
Yield: 90%

Example 16
Monomer: 50 grams of vinyl acetate (freshly distilled)
Cross-linking agent: 5 grams of ethylene bis methacrylate
Dispersing agent: 3 grams of sodium lauryl sulfate
Dispersion medium: 300 ml. of deaerated water
Catalyst: 0.3 gram of potassium persulfate and 0.13 gram of sodium bisulfite (each dissolved separately in 20 ml. of water)
Polymerization period: 18 hours After addition of 1.8 grams of sodium dodecylbenzenesulfonate and 1.8 grams of concentrated sulfuric acid, the reaction mass is heated with stirring over a steam bath for 7 hours in order to hydrolyze the ester to an alcohol. The product is purified by dialysis. A microsol wherein water is the extending medium results.

Among the useful monomers for the production of d-microgels by addition polymerization are those derived from ethylene or from butadiene. They may be hydrocarbons, e.g., ethylene, propylene, butylene, butadiene; or the substitution products thereof, e.g. halogenated hydrocarbons as chlorotrifluoro-ethylene, isoprene, or chloroprene. A group of such monomers of special importance in the present invention comprises the vinyl and vinylidene compounds, e.g. styrene, vinyl chloride, vinyl acetate and the esters of vinyl alcohol with higher acids, vinylidene chloride, vinylidene cyanide, acrylic acid, its homologs and the functional derivatives thereof, including the esters as methyl acrylate, ethyl acrylate, methyl methacrylate and ethyl methacrylate, the amides, the substituted amides and the nitriles and the salts of the acids. The preferred materials are those which are used to produce linear polymers for fiber and film manufacture, particularly acrylonitrile. The mono-olefinic monomers are especially valuable due to the relatively high thermal, oxidative and light stabilities of their products.

Appropriate cross-linking agents are chosen in accordance with conventional practice in the production of cross-linked polymers. Compounds useful in this function include those which contain two or more times the vinyl or acrylic grouping, as for instance, divinyl benzene, diallyl cyanamide, ethylene diacrylate, methylene diacrylamide, ethylene glycol divinyl ether, triethylene dimethacrylate, vinyl acrylate and glycerol trivinyl ether.

In addition to the emulsion technique described in Examples 1 to 14, the cross-linking reaction may also be carried out by subjecting an emulsion of a solution of the linear polymer in the presence of a cross-linking agent to polymerization conditions. In such a process, the cross-linking agent may act as the solvent for the linear polymer, or the linear polymer may be dissolved together with the cross-linking agent in an enert solvent.

The appropriate catalyst, dispersing agent and dispersion medium for any particular d-microgel formation is chosen in accordance with conventional practice in addition polymerization by the dispersion technique. The dispersed phase must be maintained fine enough usually by a combination of dispersing agent, agitation, and reaction period, to maintain the average size of the formed d-microgel particle to less than 3 microns in diameter.

Microgels useful in accordance with the present invention may also be formed by condensation. In such processes they are preferably produced by a modified emulsion technique. In this process, each reactant is dissolved in a different solvent, the solvents being of such character that they are immiscible, i.e., one may be polar and the other nonpolar. The solvents must be liquid at reaction temperature. An emulsion of the incompatible solvents is formed, preferably in the presence of a dispersing agent. On addition of the continuous phase reactant (i.e., the reactant soluble in the continuous phase) and the discontinuous phase reactant to the emulsion of incompatible solvents (referred to hereinafter as a reactant contact medium), polymerization by condensation occurs at the emulsion interface. The product may thereafter form a microsol in one phase or the other or alternately being non-swellable in either phase, precipitate out or form a dispersion as a d-microgel. Where required, a cross-linking agent may be incorporated in either or both phases. A stabilizing agent is advantageously employed in either or both phases where formation of the polymer occurs as a minute dispersion and precipitation is not desired. A condensing agent to remove products formed during reaction may also be present to assist polymer formation.

The following example illustrates a condensation polymerization by the modified emulsion technique in the preparation of a microgel.

*Example 17*

A reactant contact medium is formed by blending in a Waring Blendor 150 ml. of methylene chloride containing 0.75 gram of cellulose triacetate (as a stabilizing agent) and 165 ml. of water in which is dissolved 1.5 grams of the sodium salt of technical lauryl alcohol sulfate (as a dispersing agent). The organic solution forms the dispersed phase. The aqueous solution forms the continuous phase. Two reactant feed solutions continuously supply reactant to each phase of this contact medium. The rates of addition of the feed solutions are so adjusted that the dispersed phase of the contact medium always contains 1 ml. more of its reactant solution than does the continuous phase. Ten grams of adipyl chloride in 50 ml. of methylene chloride is employed as the reactant feed solution for the dispersed phase. Five grams of hexamethylenediamine in 50 ml. of water is employed as the reactant feed for the continuous phase. The continuous phase reactant feed solution also contains 2 grams of triethylenetetramine and 1 gram of 2,5,8-tris-(aminomethyl) nonane as cross-linking agents. The microgel forms as a dispersion in the aqueous phase. Upon addition of 8.5 grams of technical lauryl sulfate, it enters the methylene chloride phase. The phases are separated in a separatory funnel. The methylene chloride layer containing microgel is washed with water. The methylene chloride is distilled off. The resulting d-microgel product has an intrinsic viscosity of 0.4 in m-cresol. The individual particles vary in size from 0.01 to 0.06 micron.

Usually, the reactant of the polar solvent is a low molecular weight organic compound having two or more similar or dissimilar reactive groups selected from a member of the class consisting of primary and secondary amino, hydroxylic and mercapto. The monomer of the non-polar solvent phase is usually a low molecular weight organic compound having at least two reactive groups which are capable of reacting rapidly with ethyl alcohol at room temperature to yield a di-ester. Such compounds include polycarboxylic acid halides, phosgene, anhydrides of polycarboxylic acids, glycolchloroformates, polyisocyanates, polythioisocyanates, and polysulfonic acid halides.

In both condensation and addition polymerization processes and combinations thereof, the cross-linking may be accomplished subsequent to substantial linear polymerization. This may be done by modifying either of the techniques described above. The following example illustrates such a modification of an addition polymerization.

*Example 18*

A linear addition polymerization employing the emulsion technique of Example 1 is performed at 41° C. The reaction components are as follows:

Monomer: 16 grams of acrylonitrile
Catalyst: 0.1 gram of potassium persulfate in 20 ml. of water, 0.3 gram of sodium bisulfite in 20 ml. of water.
Dispersing agent: 1 gram of sodium lauryl sulfate
Dispersion medium: 600 ml. of water After 5½ hours 400 ml. of water and 16 grams of ethylenebismethacrylate are added. Polymerization is continued for another 15½ hours. The product is coagulated. The d-microgel formed is washed free of salt and soap.

As illustrated above, either addition or condensation polymerization is suitable for polymer formation. Procedures employing a combination of such reaction mechanisms are also possible. Regardless of the mechanism of the reaction or the technique of formation, the final particle must be sufficiently cross-linked to retain its globular shape in an extending medium, i.e., it must be capable of forming a microsol and be recoverable therefrom in discrete form. The particle must not be cross-linked to such an extent that it does not possess a "gel point." In other words, it must be capable of being swollen, thereby absorbing selected extending medium. The variation of gel point with cross-linking is illustrated in Figure VI. The two curves are a plot of viscosity in centipoises against the log of the concentrations of two microsols of acrylonitrile-ethylenebismethacrylate d-microgels in dimethylformamide. The d-microgels differ in their extent of cross-linking. The higher cross-linked particles exhibit the higher gel point. For purposes of the present invention, it is preferred that the particle exhibit a gel point of no more than about 50. This corresponds to a swellability factor as previously defined of no less than about 2. A swellability factor of at least 3 is desirable. The lower limit of cross-linking will vary widely in terms of gel point and swellability factor, depending on the nature of the particle. For instance, the swellability factor of an acrylonitrile-ethylenebismethacrylate particle may be as high as about 150. The extent of cross-linking can be controlled by conventional reaction modifications such as variation of the proportion of reactants, choice of catalyst, polymerization period, reaction temperature and the like.

The microgels have particular utility in accordance with the present invention as constituents of a permanently orientable polymeric structure in which they are present as d-microgels. By the term "permanently orientable polymeric structure" is meant a fiber or film produced by spinning, casting or the like, of a linear polymer which fiber or film may thereafter be cold drawn or hot stretched and which retains substantially its elongated form at room temperature. The usual indication of degree of orientation is the X-ray diffraction pattern. A microgel may be incorporated in any such permanently orientable polymeric structure with which it is compatible. The norm of compatibility is the existence of a solvent for the polymeric structure as defined which will also act as the extending medium in the formation of a microsol or a solvent which is miscible with another liquid which will act as the extension medium in the formation of a microsol.

The incorporation of the microgel into the linear polymer may be accomplished in various ways. The microgel in the form of a microsol may be added to the polymer. Similarly, linear polymer may be added to the microsol where the extending medium of the microsol is a solvent for the linear polymer. A microsol may be blended with a solution of the linear polymer employing as the extending medium of the microsol a liquid common to or miscible with the solvent of the solution. The linear polymer and the d-microgel, in dry form, may be added individually, or as a mixture to a liquid which is both a solvent for the linear polymer and a suitable extending medium for microsol formation. It is also possible to form the microgel in the presence of a linear polymer in certain instances. It is essential, for purposes of the present invention, that the cross-linked particle be in the swollen, i.e., microgel form, when added to the linear polymer. It is also preferred that the concentration of the microgel be no greater than its gel point at the spinning or casting temperatures. Since the gel point of any particular microsol will vary with temperature, the maximum concentration of microgel in any spinning dope will vary, depending on the spinning or casting temperature of the linear polymer.

Any conventional technique may be employed in forming the permanently orientable polymeric structure. It may be produced by wet spinning, dry spinning, casting into sheets, extrusion between rollers, and the like. Where a solvent or solvents are employed in adding the microgel, they may be partially removed prior to spinning or casting or either partially or entirely removed during such operations. In view of the fact that the microgel particle, at concentrations below the gel point, has little or no effect upon the viscosity and other physical characteristics of the spinning dope, conventional spinning apparatus, techniques and conditions may be used with little or no modification. Where wet or dry spinning is employed the conventional solvent for the polymer is replaced by a microsol extended in the conventional solvent.

The following examples illustrate procedures in the production of various fibers and films containing d-microgels.

*Example 19*

190 ml. of the dimethyl formamide microsol (containing about 4 grams of the d-microgel), as prepared in Example 3, is cooled to −30° C. 47 grams of polyacrylonitrile having an intrinsic viscosity of 1.95, pulverized to pass a 200-mesh screen, is added with stirring. The mixture is heated at a temperature of 130° C. over a period of 90 minutes. A clear spinning dope is obtained. It is spun employing the conventional dry spinning apparatus. A spinneret plate containing 5 holes each having a diameter of 0.175 mm. is used. The head temperature is maintained between 115 and 120° C. The liquid feed is delivered to the spinneret plate under a pressure of 180 p.s.i. The filaments are spun into a drying column, nine feet long and 6 inches in diameter. This column is maintained at 216° C. The filaments are collected at a windup rate of 406 feet per minute. They are then extracted with an aqueous solution of sodium lauryl sulfate in order to remove remaining solvent and thereafter drawn 8 times their original length in the presence of steam. The filaments so formed have a denier of 1.7 and contain 8% d-microgel. They have a tenacity of 4.6 grams per denier, an elongation of 11%, an initial tensile modulus of 95, a compliance ratio of 0.39, a work recovery at 3.1% of 33%, a tensile recovery at 5.1% of 71%. These various parameters are defined in U.S. Patent No. 2,604,682.

The following examples (20–24) illustrate the production of polyacrylonitrile filaments containing various d-microgels. The technique of Example 19 is followed with variations in spinning conditions as indicated in Table I. The apparatus is that of Example 19. The filament characteristics are also shown in Table I. In each example (20–24 inclusive) the polyacrylonitrile has an intrinsic viscosity of 1.95.

*Example 20*

Spinning dope:
  Linear polymer: 54.2 grams of polyacrylonitrile
  Microgel: 27.1 grams of the d-microgel of Ex. 2.
  Solvent: 190 mls. of dimethylformamide

*Example 21*

Spinning dope:
  Linear polymer: 53 grams of polyacrylonitrile
  Microgel: 7.0 grams of the d-microgel of Ex. 14
  Solvent: 237 mls. of dimethylformamide

*Example 22*

Spinning dope:
  Linear polymer: 36 grams of polyacrylonitrile
  Microgel: 9.0 grams of the d-microgel of Ex. 15
  Solvent: 144 mls. of dimethylformamide

*Example 23*

Spinning dope:
  Linear polymer: 63 grams of polyacrylonitrile
  Microgel: 12.6 grams of the d-microgel of Ex. 14
  Solvent: 237 mls. of dimethylformamide

*Example 24*

Spinning dope:
  Linear polymer: 63 grams of polyacrylonitrile
  Microgel: 22.7 grams of the d-microgel of Ex. 1
  Solvent: 237 mls. of dimethylformamide

TABLE I

| | Examples | | | | |
|---|---|---|---|---|---|
| | 20 | 21 | 22 | 23 | 24 |
| Head Temperature (° C.) | 115 | 115 | 112 | 110 | 130 |
| Feed Delivery Pressure (p.s.i.) | 300 | 210–250 | 360 | 260 | 190 |
| Drying Column Temp. (° C.) | 140 | 150 | 114 | 115 | 110–112 |
| Windup Rate (ft./min.) | 255 | 322 | 392 | 450 | 152 |
| Draw Ratio | 8× | 8× | 8× | 8× | 8× |
| Denier | 2.6 | 2.5 | 1.4 | 1.8 | 4.4 |
| Tenacity | 4.2 | 5.2 | 5.7 | 5.5 | 4.9 |
| Elongation | 9.2 | 11 | 11 | 11 | 10.6 |
| Initial Tensile Modulus | 98 | 113 | 119 | 95 | 115 |
| Compliance Ratio | 0.029 | 0.02 | 0.013 | 0.012 | 0.05 |
| Work Recovery, percent | 32 at 3 | 38 at 3.1 | | | |
| Tensile Recovery, percent | 72 at 5 | 72 at 5.1 | | | |

Example 25

A dimethylformamide composition is prepared containing 20% by weight of a mixture of equal parts by weight of polyacrylonitrile having an intrinsic viscosity of 1.95 and the d-microgel of Example 11. The components are blended in a Waring Blendor and cast into a film. The resulting pellicle contains approximately 50% d-microgel. After conditioning for two days at a relative humidity of 65%, it is noted that the film does not propagate a flame when the source of fire is removed.

Example 26

0.5 gram of the d-microgel prepared as described in Example 12 is blended in 40 grams of acetone. 5 grams of cellulose acetate is added to the resulting microsol. A clear composition results. It is cast into a film. This film is dyeable with acid dyes. Otherwise, its physical properties are substantially those of a cellulose acetate film.

Example 27

0.5 gram of the d-microgel prepared as described in Example 12 is blended in 45 grams of chloroform. 59 grams of commercial cellulose triacetate is added. The composition is cast into a film. This film is dyeable with acid dyes. Otherwise, its physical properties are substantially the same as those of a cellulose triacetate film.

Example 28

0.5 gram of the d-microgel prepared as described in Example 12 is blended in 45 grams of methylene chloride. 50 grams of a polymer prepared by the condensation of 2 moles of diphenylol propane, 1 mole of isophthaloyl chloride and 1 mole of terephthaloyl chloride as taught in U.S. Patent No. 2,035,578 is added. From the composition so prepared, a film is cast which has substantially the same appearance as a film from the linear condensation polymer alone. It is dyeable with acid dyes.

Example 29

A linear polyurethane is prepared from piperazine and ethylene bis-chloroformate. This is accomplished by adding 44.2 ml. of an aqueous solution containing 4.3 grams of piperazine and 4 grams of sodium hydroxide to an emulsion of 200 ml. of benzene in 200 ml. of water. 2 grams of sodium lauryl sulfate is employed as dispersing agent. The resulting emulsion is cooled to 5° C. 20 ml. of a benzene solution containing 9.35 grams of ethylene bis-chloroformate, prepared from ethylene glycol and phosgene by the method described by N. Rabjohn in the Journal of the American Chemical Society, volume 70, page 1182 (1948), is stirred in over a period of about 2 minutes. The polymerization mixture is stirred for an additional 2 minutes. Flocculation of the polymer is accomplished by adding acetone. The polyethylene 1,4-piperazine dicarboxylate is then filtered, washed with water, and dried.

10 grams of the polyurethane so prepared is dissolved in 45 grams of a mixture of 88 parts of chloroform and 12 parts of methanol containing 1 gram of the d-microgel prepared as described in Example 12. A film cast from this composition is dyeable with acid dyes but otherwise shows substantially the same physical properties as a film from the linear polymer alone.

Example 30

A dispersion of 0.5 gram of the d-microgel prepared as described in Example 12 is blended in 45 grams of dimethylformamide. 5 grams of polyacrylonitrile having an intrinsic viscosity of 1.95 is stirred into the microsol and heated to attain solution. A film cast from this solution is dyeable with acid dyes. Otherwise, it exhibits substantially the same physical properties as a film obtained from the linear polymer alone.

Example 31

190 grams of aqueous solution containing 6% sodium hydroxide and 8.4 grams of the d-microgel of Example 13 is added to 900 grams of a cellulose xanthate spinning solution containing 7% cellulose and 6% sodium hydroxide. The cellulose xanthate spinning solution is prepared by adding 32% carbon disulfide (based on the original cellulose charge) to the alkali cellulose. The solution is spun in a conventional wet spinning device through a 100-hole (each having a diameter of 0.0025 inch) spinneret into a 50° C. regenerating bath containing an aqueous solution of 9% sulfuric acid, 19.75% sodium sulfate, 2.0% glucose and 0.7% zinc sulfate. The gel fiber is stretched 20% in air and collected on a bobbin. After washing the yarn is desulfured on the bobbin with 0.5% solution of sodium carbonate in water for 30 minutes at 50° C. It is then twisted, dried and boiled off. The resulting fiber contains 85% cellulose and 15% d-microgel. The properties of the yarn are listed below:

Denier _____ 2.8
Tenacity _____ 1.8
Elongation _____percent__ 25
Initial modulus _____ 45
Compliance ratio _____ 0.39

Example 32

5.6 grams of the d-microgel of Example 16 is substituted in the procedure of Example 31 for the d-microgel used therein. The resulting yarn contains 90% cellulose and 10% d-microgel. The properties of the yarn are listed below:

Denier _____ 2.4
Tenacity _____ 2.1
Elongation _____percent__ 24
Initial modulus _____ 57
Compliance ratio _____ 0.38

Example 33

A microgel is prepared employing the technique of Example 1 using the following reactants:

Monomer: 23 grams of acrylonitrile
Cross-linking agent: 8 grams of 50% divinylbenzene
Catalyst: .1 gram $K_2S_2O_8$ in 20 cc. water
Modifying monomer: 23 grams sodium methallylsulfonate
Activator: .05 gram $K_2HSO_3$ in 20 cc. water
Dispersing agent: 4 grams sodium "Lorol" sulfate
Dispersion medium: 750 cc. distilled deaerated water
Polymerization period: 16 hours
Polymerization temperature: 37° C.
Sulfur analysis: 6.5%
Gel point: 14.3%
Yield: 47%

The dispersion is coagulated by addition of salt. It is filtered, washed and dispersed in 400 cc. of dimethyl formamide. The residual water is removed by distillation under reduced pressure.

140 grams of the above-prepared microsol (containing 20 grams of d-microgel) is cooled to −30° C. 40 grams of polyacrylonitrile having an intrinsic viscosity of 1.95 is slurried in. The slurry is heated under nitrogen at a temperature of 125° C. for 90 minutes. A spinning dope results which is spun following the spinning technique of Example 19. Spinning conditions are as follows:

Head temperature _____°C__ 106
Column temperature _____°C__ 195
Air temperature _____°C__ 165
Wind-up _____y.p.m__ 84

The yarn is drawn 4 times in a steam tube.

The following example is cited to illustrate dyeability of a fiber containing d-microgel.

Example 34

0.1 gram of the yarn produced in Example 19 is immersed for 60 minutes at 100° C. in a dyebath having the following components (proportions of all ingredients listed are based on the weight of the fiber):

50 parts of water
5 parts of C.I. (Color Index) 636
5 parts of acetic acid

The fiber dyes yellow. A control polyacrylonitrile yarn in the same bath and under the same conditions is not affected by the dye.

The examples in Table II illustrate the dyeability of various yarns produced in accordance with the present invention. The procedure of dyeing follows the technique of Example 34.

TABLE II

| Examples | Fiber | C. I. No. Dye | Color |
|---|---|---|---|
| 35 | Ex. 19 | PR 12 (Acidic) | Blue. |
| 36 | Ex. 19 | 179 (Acidic) | Red. |
| 37 | Ex. 19 | 161 (Acidic) | Orange. |
| 38 | Ex. 19 | 639 (Acidic) | Yellow. |
| 39 | Ex. 33 | 677 (Basic) | Fuchine. |
| 40 | Ex. 33 | 657 (Basic) | Green. |
| 41 | Ex. 33 | 922 (Basic) | Blue. |

In each of Examples 34 to 41 a polyacrylonitrile control yarn which does not contain microgel is unaffected by the dye.

In accordance with the present invention, a microgel may be incorporated in any permanently orientable polymeric structure prepared from a polymer with which the microgel is compatible. These polymeric structures may be either natural or synthetic. Among such materials may be mentioned cellulose and its derivatives, for instance, its esters such as nitrocellulose, cellulose acetate, cellulose butyrate and its esters with higher organic acids; cellulose ethers, such as methyl cellulose and ethyl cellulose. The microgels may also be incorporated in cellulose derivatives used in the production of regenerated cellulose, for instance, those used in the cuprammonium process and in the cellulose xanthate process. Other natural or modified natural fiber or film-forming materials wherein microgels are useful are the proteins or the modified proteins, for instance, those from casein and zein. Among the useful fully synthetic linear high polymeric materials are included such condensation polymers as the polyamides, polyureas, polyurethanes, polysulfonamides, polyesters. Specific examples are such polymers as those obtained by condensation of terephthalic acid, adipic acid or sebacic acid and hexamethylene diamine, or bis-amino cyclohexylmethane; caprolactam; terephthalic acid and ethylene glycol; hexamethylene diisocyanate and 1,4-butene diol; and hexamethylene diisocyanate and hexamethylene diamine. Addition polymers and copolymers are especially useful. They may be made from polymerizable mono-olefinic unsaturated low molecular compounds, for instance, ethylene and its derivatives, as isopropylene, isobutylene, the vinyl and acrylic compounds, as acrylonitrile, vinyl chloride, vinyl acetate, vinylidene chloride, vinylidene cyanide, the esters and amides of acrylic and methacrylic acid, e.g., methyl acrylate, methyl methacrylate, acrylamide, etc., according to known methods. Acrylonitrile containing structures are preferred. Those containing about 40%, and especially those having at least about 85% or more acrylonitrile as copolymer or mixed polymer are considered to possess particular commercial potentialities.

The d-microgel content in permanently orientable fiber or film may vary over a wide range. It may be a mere trace as low as 1% or a fraction thereof. The upper limit is governed only by the amount of linear polymer necessary to form a continuous, bonding, cohesive mass. This maximum content of d-microgel depends to a large extent on its nature. In general, the hard d-microgels, i.e., those with a relatively low swelling factor (being relatively highly cross-linked) can compose up to as much as about 65% of the fiber or film. The softer d-microgels can compose as much as about 90% in some instances. For purposes of the present invention, it is preferred that at least about 10% by weight of linear polymer be present in the formed fiber or film.

The amount of d-microgel used in any particular instance depends primarily on the effect desired with due consideration for the inherent properties of the microgel and the linear polymer. A content of 5% to 30% will usually suffice to control dyeability. Often amounts as low as 1% to 3% are sufficient.

As previously mentioned, the linear polymer containing the microgel can be processed according to any conventional method. The usual spinning, casting and extruding equipment is usually suitable with little or no modification. Minor changes are at times required, for instance, in solvent spinning when microgels are used with relatively large particle sizes in the swollen state such as more than about 3 or 4 micron sand packs having pore sizes in the range which permit the microgel to pass must be substituted for those normally employed. This is not necessary when the microgel used has a particle size of less than 1 or 2 microns in the swollen state. In the dispersion spinning method (United States Patent No. 2,753,317), no changes are generally necessary with the exception of the incorporation of the microgel as taught herein.

Linear polymers which contain relatively high concentrations (i.e., 10 to 20% or more) of low swelling microgels can be spun essentially as readily as those of the linear polymer in the same concentration. This is of importance where polymers have to be processed at a relatively high temperature or from solutions which because of their relatively high intrinsic viscosity must necessarily be of a low solids content. In accordance with the present invention solids content can be increased at a given temperature without substantial viscosity change. Thus, the output of fiber or film per time unit in a given operation may be increased. Even where the d-microgel content reaches the range of about 30 to 60% or higher based on polymer, the mechanical properties and the physical properties at elevated temperature of the fiber or films are not adversely affected. Furthermore, the spinning temperatures can be lowered at a given solids concentration, if desired. This is of particular importance with heat sensitive polymers, for example, those produced from acrylonitrile, i. e., the polymers or copolymers of acrylonitrile, especially those with more than 85% acrylonitrile.

The fiber or film containing d-microgel may be after-treated in the usual manner. In general, no change of procedure or apparatus is necessary since the physical properties of the structures are essentially those of the linear polymer. This is especially evident in stretched or oriented fiber or film. The presence of d-microgel does not affect the capacity of the fiber or film to be stretched and oriented. In some cases, it has been observed that tenacity is improved by the presence of the d-microgel. The stretching can be effected with any of commonly used devices, for instance, between hot or cold rolls, drawing in boiling water, steam, heated gases, etc. It may be followed, if necessary, by relaxing steps, heat setting, boiling off and other procedures which are conventional with the specific corresponding linear fiber or film type.

It has also been observed that microgels of an appropriate size produce a blue opalescence when incorporated in polymeric materials. This effect compensates for the natural yellowish or gray discoloration of many of the fiber materials and results in a permanent whitening.

It is possible, as previously pointed out, by the incorporation of microgels to introduce into a fiber or film any desired "active group" or chemical element without adversely affecting the mechanical properties or the physical properties at elevated temperature of the linear counterpart. An important application is the introduction of dye acceptor groups into a fiber or film by use of microgels. This is very important in those polymeric materials which are difficult to dye with conventional dyes due to the hydrophobic nature of such materials or because of their neutral chemical composition. The dye acceptor group may be of basic nature, thus promoting the dyeability of the fiber for acid dyestuffs. Conversely, it may be of acid nature thus promoting dyeability of the fibers with basic dyestuffs. Furthermore, microgels may be used to further enhance the dyeability of a fiber or film which has a natural affinity for either acid or basic dyes. Mixtures of microgels with basic dye acceptor groups and of microgels with acid dye acceptor groups may be employed together to give the resultant structure affinity for both acid and basic dyes. In general, the dyeability of the fiber or film material can be controlled by introducing only small amounts of microgels containing dye acceptor groups. As low as 1% (based on the weight of linear polymer) microgel or a fraction thereof containing dye acceptor groups result in an improved dyeable fiber material. In the case of basic dye acceptor groups amounts as low as 0.4% by weight basic nitrogen, having a basic strength equivalent to pyridine or greater will result in excellent dyeability of fiber or film materials which are otherwise only difficultly dyeable. The amount of microgel necessary to impart optimum dyeability to the material depends on the chemical nature of the polymeric fiber or film material, on the nature of the dyestuffs to be used, and on the nature and amount of the dye acceptor groups in the microgel. Thus, it is sometimes desirable to increase the d-microgel content of the fiber or film to 10% or even 20%. The expression "dye acceptor groups" as used here comprises chemical groups or elements which improve the dyeability of materials by physically or chemically binding the dyestuff molecules. They may be of acid nature furnishing ionic hydrogen, such as sulfonic acid, phosphonic acid, carboxylic acid and mercapto groups; of a basic nature such as primary, secondary, and tertiary amino groups which may be or may not be a part of a carbon nucleus as, for instance, in heterocyclic nitrogen-containing compounds.

As an example of a fiber, which can be greatly improved in its dyeability without impairing the thermal and mechanical properties, may be mentioned the fibers consisting of polymers or copolymers of acrylonitrile, especially those with more than 40% acrylonitrile. The tenacity and glazing temperature of these acrylonitrile fibers are not adversely affected when microgels containing basic or acid dye acceptor groups are incorporated into them. Among the microgels useful for improving the dyeing properties of acrylonitrile fibers are those made from acrylonitrile, a cross-linking agent and allyl sulfonic acid. Instead of allyl sulfonic acid, other comonomers containing dye acceptor groups, for instance, methallyl sulfonic acid, propene-2-phosphonic acid, styrene-4-sulfonic acid, vinylpyridine or vinyl oxyethylamine or mixtures of these components may be used. Part or all of the acrylonitrile used in the microgel formation may be substituted by other linear polymer-forming monomers. The dye acceptor groups may also be contained in the cross-linking agent as, for instance, in divinylbenzenesulfonic acid.

Some microgels, particularly those containing phosphorus in an oxidized form, may not only improve the dyeability of the materials wherein they are incorporated but also reduce the burning rate of the linear polymer. It is known that phosphorus-containing compounds or chlorine-containing compounds, as well as many others substantially reduce the burning rate or inflammability of the fiber materials in which they are incorporated. However, the mechanical properties and physical properties at elevated temperature of such fiber or film material is usually impaired when they contain large amounts of these flame-retarding compounds. It is possible to incorporate up to 50% or even more of flame-retarding microgel into a fiber or film of linear polymer such as acrylonitrile polymer. Examples of microgels useful in this function are those obtained from vinyl chloride, vinylidene chloride, or chlorinated polyvinyl chloride and small amounts of cross-liking agents which may also contain chlorine. Instead of chlorine, the flame-retarding microgels may also contain other halides. Other microgels useful for flame-retarding effects may contain phosphorus, preferably phosphorus in an oxidized form. As little as 2% of phosphorus in the fiber or film reduces the burning rate. For practical purposes, it is preferred that these d-microgels contain at least from about 5% to about 25% by weight phosphorus. Excellent results are obtained, for instance, with fibers from polyacrylonitrile or the copolymers thereof, containing at least 40% acrylonitrile, having incorporated 10% to 20% of d-microgels with 10 to 25% by weight phosphorus content. Such fibers have very slow burning rates so that they can be designated as flame-retardant. Similar results can be obtained by incorporating between 30% and 60% of microgels consisting substantially of cross-linked polyvinyl chloride or polyvinylidene chloride. The other thermal and mechanical properties of the fiber and film are unchanged compared with the corresponding linear polymeric structure.

Many other properties in addition to those listed above can be effected in permanently orientable polymeric structures by the addition of a microgel. Thus, it is possible by the judicious choice of microgel to reduce sheen, introduce fluorescence, improve mechanical strength, deluster, impart elasticity, impart novel dyeing effects, impart abrasive resistance, impart abrasive characteristics, impart a hydrophilic character, impart a hydrophobic character, impart pigmentation, impart increased electrical conductivity, impart increased electrical resistance, increase electrostatic tendencies, decrease electrostatic tendencies, impart photosensitivity, and the like.

Besides their inherent properties, the microgel particles may act as a vehicle for other desired additives in formed structures. Thus, the extending medium of the microsol may be an antioxidant, antistatic agent or the like. In addition to the formed structure occluded extending medium tends to incorporate such properties into the structures.

Many other modifications, within the scope of the present invention, will be apparent to those skilled in the art from a reading of this disclosure without a departure from the inventive concept.

What is claimed is:

1. A composition of matter comprising a solution of a saturated, linear polymer and a swollen particle of a unimolecular, synthetic, organic, cross-linked polymer in an extending and swelling liquid therefor, the said swollen particle in its unswollen form having an average diameter of at least about 0.01 micron and no greater than about 3 microns and the concentration of the said swollen particle in the said extending and swelling liquid being no greater than the concentration at which abrupt increase in viscosity is experienced as the concentration of the said swollen particle in the said extending and swelling liquid is increased.

2. A spinning dope comprising a solution of a saturated, linear polymer and a swollen particle of a unimolecular, synthetic, organic, cross-linked polymer in an extending and swelling liquid therefor, the said swollen particle in its unswollen form having an average diameter of at least about 0.01 micron and no greater than about 3 microns and the concentration of the said swollen particle in the said extending and swelling liquid being, at the spinning temperature, no greater than the concentration at which abrupt increase in viscosity is experienced as the concentration of the said swollen particle in the said extending and swelling liquid is increased at the said spinning temperature.

3. A composition for film casting which comprises a solution of a saturated, linear polymer and a swollen particle of a unimolecular, synthetic, organic, cross-linked polymer in an extending and swelling liquid therefor, the said swollen particle in its unswollen form having an average diameter of at least about 0.01 micron and no greater than about 3 microns and the concentration of the said swollen particle in the said extending and swelling liquid being, at the casting temperature, no greater than the concentration at which abrupt increase in viscosity is experienced as the concentration of the said swollen particle in the said extending and swelling liquid is increased at the said casting temperature.

4. A composition of matter comprising a solution of a permanently orientable polymer and a composition compatible therewith comprising a swollen particle of a unimolecular, synthetic, organic, cross-linked polymer in an extending and swelling liquid therefor.

5. A composition of matter comprising a dimethylformamide solution of a linear polymer produced from acrylonitrile and a composition of matter compatible therewith comprising a swollen particle of a unimolecular, synthetic, organic, cross-linked polymer in an extending and swelling liquid therefor, the said swollen particle in its unswollen form having an average diameter of at least about 0.01 micron and no greater than about 3 microns and the concentration of the said swollen particle in the said extending and swelling liquid being no greater than the concentration at which abrupt increase in viscosity is experienced as the concentration of the said swollen particle in the said extending and swelling liquid is increased.

6. The composition of claim 5 wherein the linear polymer produced from acrylonitrile is polyacrylonitrile.

7. A composition of matter comprising a swellable particle of a unimolecular, synthetic, organic, cross-linked polymer which in its unswollen form has an average diameter of no greater than 3 microns and of at least about 0.01 micron and a saturated polymer capable of permanent orientation.

8. A composition of matter comprising dimethylformamide having dissolved therein polyacrylonitrile and having extended therein a compatible swollen particle of a unimolecular, synthetic, organic, cross-linked polymer which in its unswollen form has an average diameter of at least about 0.01 micron and no greater than about 3 microns.

9. A composition of matter comprising acetone having dissolved therein cellulose acetate and having extended therein a compatible swollen particle of a unimolecular, synthetic, organic, cross-linked polymer which in its unswollen form has an average diameter of at least about 0.01 micron and no greater than about 3 microns.

10. A composition comprising chloroform having dissolved therein cellulose triacetate and having extended therein a compatible swollen particle of a unimolecular, synthetic, organic, cross-linked polymer which in its unswollen form has an average diameter of at least about 0.01 micron and no greater than about 3 microns.

11. A composition of matter comprising a mixture of chloroform and methanol having dissolved therein polyurethane and having extended therein a compatible swollen particle of a unimolecular, synthetic, organic, cross-linked polymer which in its unswollen form has an average diameter of at least about 0.01 micron and no greater than about 3 microns.

12. A composition of matter comprising water having dissolved therein cellulose xanthate and having extended therein a compatible swollen particle of a unimolecular, synthetic, organic, cross-linked polymer which in its unswollen form has an average diameter of at least about 0.01 micron and no greater than about 3 microns.

13. A permanently orientable structure comprising a swellable particle of a unimolecular, synthetic, organic, cross-linked polymer which in its unswollen form has an average diameter of no greater than 3 microns and of at least about 0.01 micron and a linear polymer.

14. A fiber comprising a swellable particle of a unimolecular, synthetic, organic, cross-linked polymer which in its unswollen form has an average diameter of no greater than 3 microns and of at least about 0.01 micron and a permanently orientable linear polymer.

15. An oriented funicular structure comprising a cohesive matrix of a saturated polymer having incorporated therein a swellable particle of a unimolecular, synthetic, organic, cross-linked polymer which in its unswollen form has an average diameter of at least about 0.01 micron and no greater than about 3 microns.

16. The structure of claim 15 wherein the said swellable particle of polymer is cross-linked by a lower alkylenebisacrylate.

17. The structure of claim 15 wherein the said swellable particle of polymer is cross-linked by divinylbenzene.

18. The structure of claim 15 wherein the said swellable particle of polymer is cross-linked by benzenediallylphosphonate.

19. The structure of claim 15 wherein the polymer is produced from acrylonitrile.

20. The structure of claim 15 wherein the polymer is polyacrylonitrile.

21. The structure of claim 15 wherein the polymer is cellulose acetate.

22. The structure of claim 15 wherein the polymer is cellulose triacetate.

23. The structure of claim 15 wherein the polymer is polyurethane.

24. The structure of claim 15 wherein the polymer is regenerated cellulose.

25. The structure of claim 15 wherein the said swellable particle of polymer is cross-linked by ethylenebismethacrylate.

26. The structure of claim 25 wherein the said swellable particle of polymer comprises a polymer of acrylonitrile.

27. The structure of claim 25 wherein the said swellable particle of polymer comprises polyacrylonitrile.

28. The structure of claim 25 wherein the said swellable particle of polymer comprises methacrylonitrile and vinyl pyridine.

29. The structure of claim 25 wherein the said swellable particle of polymer comprises polydimethylaminoethylmethacrylate.

30. A permanently orientable structure comprising a cohesive matrix of a saturated polymer having incorporated therein a swellable particle of a unimolecular, synthetic, organic, cross-linked polymer which in its unswollen form has an average diameter of at least about 0.01 micron and no greater than about 3 microns, the said structure bearing a dye toward which the said swellable particle is sensitive.

31. A process of dyeing a structure produced from a permanently orientable polymer which comprises incorporating within the said structure a swellable particle of a unimolecular, synthetic, organic, cross-linked polymer which in its unswollen form has an average diameter of at least about 0.01 micron and no greater than about 3 microns, the said swellable particle being sensitive to a dye and thereafter exposing the said structure to the said dye.

32. The process of claim 31 wherein the polymer is produced from an acrylonitrile.

33. The process of claim 31 wherein the polymer is polyacrylonitrile.

34. The process of claim 33 wherein the said swellable particle of polymer is a polymer of acrylonitrile cross-linked with divinylbenzene and the dye is a basic dye.

35. The process of claim 33 wherein the said swellable particle of polymer is a polymer of acrylonitrile cross-linked with ethylene bisacrylate and the dye is an acid dye.

36. An oriented film comprising a cohesive matrix of a saturated polymer having incorporated therein a swellable particle of a unimolecular, synthetic, organic, cross-linked polymer which in its unswollen form has an average diameter of at least about 0.01 micron and no greater than about 3 microns.

References Cited in the file of this patent

UNITED STATES PATENTS

| | | |
|---|---|---|
| 2,616,877 | McMaster | Nov. 4, 1852 |
| 2,636,851 | Juda et al. | Apr. 28, 1953 |
| 2,652,378 | Caldwell | Sept. 15, 1953 |
| 2,687,393 | Trementozzi | Aug. 24, 1954 |
| 2,688,008 | Chaney | Aug. 31, 1954 |
| 2,691,641 | Ham | Oct. 12, 1954 |
| 2,696,478 | Craig | Dec. 7, 1954 |

FOREIGN PATENTS

| | | |
|---|---|---|
| 675,278 | Great Britain | July 9, 1952 |
| 493,563 | Canada | June 9, 1953 |

UNITED STATES PATENT OFFICE
CERTIFICATE OF CORRECTION

Patent No. 2,908,659            October 13, 1959

Victor E. Shashoua

It is hereby certified that error appears in the printed specification of the above numbered patent requiring correction and that the said Letters Patent should read as corrected below.

Column 4, lines 7 and 8, for that portion of the formula reading "100" read -- $\frac{100}{S}$ --;

column 10, line 23, for "Patent No. 2,604,682" read -- Patent No. 2,604,689 --; column 16, line 46, for "In" read -- On --; column 20, line 3, list of references cited, under the heading "UNITED STATES PATENTS", for the date "Nov. 4, 1852" read -- Nov. 4, 1952 --.

Signed and sealed this 16th day of August 1960.

(SEAL)
Attest:

KARL H. AXLINE            ROBERT C. WATSON
Attesting Officer            Commissioner of Patents